Nov. 17, 1936.  G. G. HARRINGTON  2,060,989

CUTTER MOUNTING

Filed May 2, 1935

George G. Harrington INVENTOR.

BY J. Vincent Martin and
John W. Poteet, Jr.

ATTORNEYS.

Patented Nov. 17, 1936

2,060,989

UNITED STATES PATENT OFFICE 2,060,989

CUTTER MOUNTING

George G. Harrington, Houston, Tex., assignor to Reed Roller Bit Company, Houston, Tex., a corporation of Texas Application May 2, 1935, Serial No. 19,379

11 Claims. (Cl. 255—71)

This invention relates generally to deep well drilling apparatus, and specifically to roller bits.

The so-called cone bit includes a head having a bottom recess, and a pair of conical cutters in the recess and enclosing the spindles on which they are mounted. The spindles are rendered inaccessible by the cutters, and various means have heretofore been devised to rotatably lock the cutters on the spindles by means of rolling bearings. This invention, while capable of use in various types of roller bits, will be found particularly useful in the cone bit.

The principal object of the invention resides in the insertion of the rolling bearings through the cutters and spindles into the raceways in the cutters and spindles in such a manner as to avoid interruption and consequent failure of the cutter raceway.

A further object is to provide, for the introduction of the rolling bearings into the raceways, a bore leading into the spindle raceway at a point remote from the bottom portion of the spindle, which portion is subjected to the greatest loads.

Various other objects and advantages of the invention will hereinafter appear.

Figure 1:
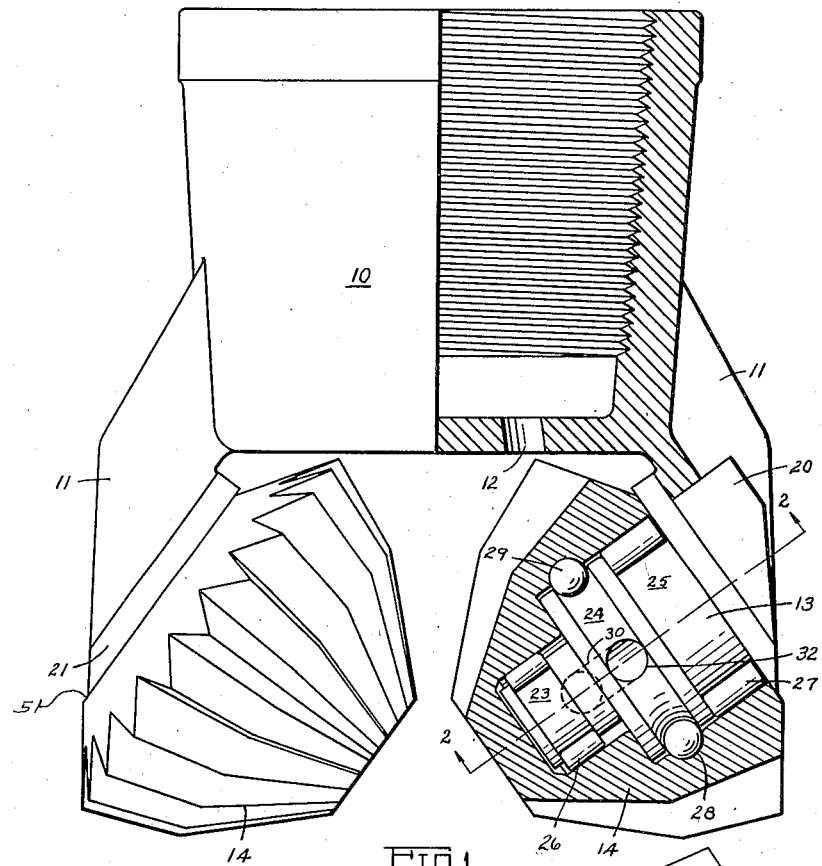
Figure 2:
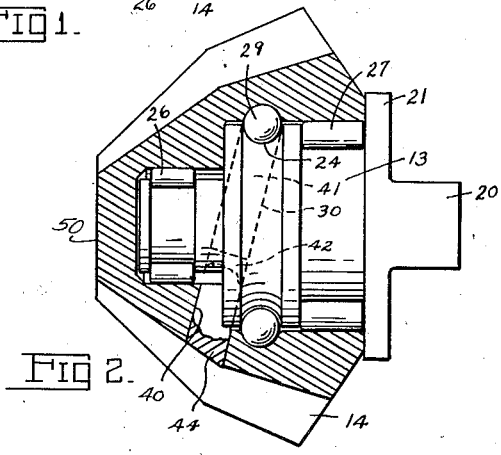

In the drawing Fig. 1 illustrates the bit in vertical elevation, parts being shown in section; Fig. 2 is a sectional view on the line 2—2 of Fig. 1.

In the drawing I have illustrated one preferred embodiment of my invention comprising a head 10 having projecting arms 11 thereon, the central portion of the head being perforated by a plurality of openings 12. Spindles 13 are secured to the projections 11 by welding or other fastening means, and the roller cutters 14 are rotatably locked on these spindles.

The spindle 13 carries a projection or shank portion 20 which is arranged to be locked to the projection 11 on the head. Between this shank portion and the spindle portion proper is positioned a flange or bearing portion 21. This portion provides an abutment for the spindle against the head as well as a bearing portion for the cutter on the spindle.

Rolling bearings are used to support the cutter on the spindle, and to rotatably lock it thereon. The spindle is arranged with a plurality of grooves, slots or raceway portions for rolling bearings at 23, 24 and 25; the grooves 23 and 25 receiving roller type bearings 26 and 27, and the groove 24 being complemental to a similar groove 28 in the cutter receiving ball bearings 29.

The ball bearings 29 are arranged substantially centrally of the cutter adjacent the zone of major loading and lock the cutter in place. To provide for the insertion of these balls a passageway or bore is arranged through the spindle having an opening into the spindle ball race at 32. The cutter raceway 28 is continuous or uninterrupted.

The cutter 14 has a drill hole, cutter bore or opening 40 to allow the cutter and bearing to be assembled. The rolling bearing means 29 are inserted through this bore, through the ball hole or bore 30 and into the complemental raceways 24 and 28. After the balls have been inserted a plug 41 is inserted through the bore and locked in position by weld 42. The hole in the cutter 14 is then sealed by weld 44. The bore hole 40 in the cutter is remote from the cutter raceway 28 and is shown toward the point 50. It can extend toward the base 51, however, if desired. The thrust, if any, is entirely separate on the spindle and cutter as welds 42 and 44 which plug the bores 30 and 40 are not in contact.

Because of the position of the bore 30 in a substantially horizontal plane, substantially transversely of the spindle, substantially all thrust on the cutter is taken by the bearings below the central plane of the cutter. The part of the spindle ball bearing raceway which is the outer surface of the plug 41 receives very little, if any, of this thrust. As a consequence of this novel mode of assembling the cutters and their bearings on the spindle, a much more efficient bearing assembly is obtained and the assembly is more durable and lasts longer in use.

While I have shown a particular embodiment of my invention, I aim to cover all modifications within the true spirit and scope of the same by the hereto appended claims.

I claim:

1. A bit having a head, a spindle carried by said head, a roller cutter on said spindle; said spindle and cutter having raceways and bores registrable with each other, the spindle bore communicating with the spindle raceway, and rolling bearings insertable thru said bores into said raceways to rotatably lock said cutter on said spindle, said cutter bore being remote from said cutter raceway.

2. A bit having a head, a spindle carried by said head, a roller cutter enclosing said spindle; said spindle and cutter having raceways and bores registrable with each other, the spindle bore communicating with the spindle raceway, and rolling bearings insertable thru said bores into said raceways to rotatably lock said cutter on said spindle, said cutter bore being remote from said cutter raceway.

3. A bit having a head, a spindle carried by said head, a roller cutter on said spindle; said spindle and cutter having raceways and bores registrable with each other, the spindle bore communicating with the spindle raceway, and rolling bearings insertable thru said bores into said raceways to rotatably lock said cutter on said spindle, said cutter bore being remote from said cutter raceway, the cutter bore being removed from the cutter raceway toward the point of the cutter.

4. A roller cutter and spindle assembly having complemental rolling bearing raceways, registrable bores in the spindle and cutter for the insertion of rolling bearings into the raceways to lock the cutter rotatably on the spindle and separated plugs in said bores.

5. A roller cutter mounting comprising a spindle, a cutter on said spindle, complemental raceways in said spindle and said cutter, rolling bearings in said raceways and rotatably locking said cutter on said spindle, a bore extending through said spindle forwardly from said raceway and opening thereinto, a plug in said bore sealing said bore, and a passageway through the cutter wall registrable with said spindle bore and being sealed.

6. A roller cutter mounting comprising a spindle and a substantially frusto conical cutter mounted thereon, complemental grooves on the spindle and cutter, rolling bearings in said grooves, a transverse passageway in said spindle connected to the groove on said spindle and opening through the surface of said spindle at a point remote from said groove and sealed by a plug, the opening of said passageway into the groove being positioned away from the thrust receiving zone on the spindle.

7. A roller cutter mounting comprising a spindle, a cutter on said spindle, rolling bearings between said cutter and spindle, complemental grooves in the central part of said spindle and said cutter forming a passageway, ball bearings in said passageway rotatably locking said cutter on said spindle, a passageway extending transversely through said spindle leading away from said bearing passageway and opening thereinto, a plug in said transverse passageway sealing said bearing receiving passageway, and a passageway through the cutter wall registrable with said spindle passageway and being sealed.

8. A roller cutter mounting comprising a spindle and a cutter on the spindle having complemental grooves forming a raceway, bearings in said grooves rotatably locking the cutter on the spindle and a passageway in said spindle connecting with a spindle groove, and means for inserting said bearings through the spindle and cutter independently of the cutter groove.

9. A roller cutter mounting comprising a spindle, a cutter surrounding said spindle, complemental grooves in the spindle and cutter forming raceways, ball bearings in said raceways rotatably locking the cutter on the spinlde, a passageway through said spindle opening into the spindle groove, a plug in said passageway sealing said bearing, a passageway through the cutter wall registrable with said spindle passageway, and being remote from said cutter groove and being sealed.

10. A roller cutter mounting comprising a spindle, a cutter on said spindle, said cutter and spindle having complemental grooves therein forming a raceway, bearings in said grooves, and said spindle having a bore extending transversely thereof connecting with the groove in said spindle and opening through the surface of said spindle at a point remote from said raceway.

11. A roller cutter mounting comprising a spindle, a cutter on said spindle, said cutters and spindle being formed with complemental grooves therein providing a raceway, bearings in said grooves, and said spindle having a passageway extending transversely thereof connecting with said grooves and opening through the surface of said spindle at a point remote from said raceway.

GEORGE G. HARRINGTON.